United States Patent Office 3,033,901
Patented May 8, 1962

3,033,901
PRODUCTION OF N,N'-BIS-(THIOCARBAMYL)-HYDRAZINE FROM THIOSEMICARBAZIDE
John Song, North Plainfield, N.J., assignor to American Cyanamid Company, New York, N.Y., a corporation of Maine
No Drawing. Filed Oct. 27, 1955, Ser. No. 543,276
1 Claim. (Cl. 260—552)

This invention relates to an improved process for the production of N,N'-bis-(thiocarbamyl)-hydrazine by the reaction of thiosemicarbazide and a thiocyanate.

N,N'-bis-(thiocarbambyl)-hydrazine is a useful intermediate for the preparation of other chemicals. It is particularly useful for cyclizing to form 2-amino-5-mercapto-1,3,4-thiadiazole which compound may then be acetylated to 2-acetylamino-5-mercapto-1,3,4-thiadiazole, which may be chlorinated to 2-acetylamino-1,3,4-thiadiazole-5-sulfonyl chloride which on treatment with ammonia gives 2-acetylamino-1,3,4-thiadiazole-5-sulfonamide.

The reactions using ammonium thiocyanate and semicarbazide and the conversion to 2-acetylamino-1,3,4-thiadiazole-5-sulfonamide are illustrated as follows:

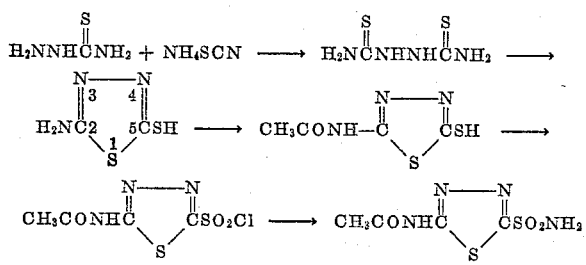

The chemistry involved is complicated by the fact that tautomers and polymorphism exists in at least some several of the intermediates. The recent review by L. L. Bambas, The Chemistry of Heterocyclic Compounds, Interscience Publishers, Inc., New York, 1952, at page 149 lists two reported forms of N,N'-bis-(thiocarbamyl)-hydrazine, the chemical reactions of which are reported as identical.

A recent patent to Swimmer, Preparation of Thiosemicarbazide and Isomers Thereof, 2,710,243, June 7, 1955, discloses a reaction of hydrazine and potassium or sodium thiocyanate to produce thiosemicarbazide and its isomer hydrazine thiocyanate. This patent discloses that N,N'-bis-(thiocarbamyl)-hydrazine there referred to as 1,2-di-(thiocarbamyl)-hydrazine and elsewhere referred to as bithiourea may be produced as a by-product of the reaction. It has also been known that the introduction of hydrogen chloride gas into an aqueous solution of thiosemicarbazide causes the formation of N,N'-bis-(thiocarbamyl)-hydrazine and hydrazine hydrochloride, Freund and Shender, Ber. 29, 2502 (1896). Whereas these reactions do give N,N'-bis-(thiocarbamyl)-hydrazine, for the production of pharamaceutical materials it is highly desirable that the N,N'-bis-(thiocarbamyl)-hydrazine be obtained both as a pure product and in high yields. These criteria have not previously been adequately met for this synthesis.

It has now been found that thiosemicarbazide reacts with a thiocyanate salt to form N,N'-bis-(thiocarbamyl)-hydrazine. Not only does this reaction occur, but under the conditions of the present invention in its preferred form occurs to give a remarkably pure product and in very high yields.

Thiosemicarbazide may be reacted with a substantially stoichiometric quantity of a thiocyanate salt in the presence of sulfuric acid. The sodium, ammonium and potassium thiocyanates are particularly convenient because they may be easily obtained commercially and the ammonia or sodium or potassium produced as the sulfate salt is easily removed from the reaction product. Other salts may be used in which either the cation forms an insoluble sulfate or in which it forms a sulfate which is sufficiently soluble to be removed with the solution from the precipitated N,N'-bis-(thiocarbamyl)-hydrazine.

The reaction is most conveniently conducted in an aqueous solution.

From about 1½ to 2¼ parts of water per part of thiosemicarbazide gives excellent results. Larger quantities may be used or small quantities may be used but the problem of separating the desired product from the reaction mixture then becomes more complicated. The amount of sulfuric acid should be at least about half the equivalent quantity of the ammonium thiocyanate used. More is conveniently used because sulfuric acid is a very cheap reagent.

The reaction components, the thiocyanate salt, the sulfuric acid and thiosemicarbazide may be combined in any order at room temperature and then the composition heated, or the thiosemicarbazide may be added to the aqueous acid while hot and then the thiocyanate salt added to the hot solution. The reaction is speeded up at higher temperatures and accordingly it is convenient to use a temperature of at least about 85° C. and preferably above about 100° C., as above 100° C. the reaction occurs more rapidly; any temperature up to the boiling point of the mixture is conveniently used.

Because of the numerous tautomeric forms which may occur and because much of the chemistry involved is still in a formative stage, it is speculative to comment on the reaction mechanisms. However, by following the procedures herein set forth a very high yield of a very pure N,N'-bis-(thiocarbamyl)-hydrazine may be rapidly and conveniently produced. The product is conveniently separated from the reaction mixture by cooling to room temperature and filtering, and as so separated, even while wet, may be used as an intermediate for further processing.

*Example 1*

To a mixture of 54 parts of concentrated sulfuric acid and 192 parts of water is added 91 parts of thiosemicarbazide. The mixture is heated with stirring to a temperature of about 92° C. and 85.5 parts of ammonium thiocyanate is then added. The mixture is kept hot and the temperature raised to between about 105–108° C. (reflux) until the reaction is substantially complete. The reaction mixture is cooled to room temperature and the N,N'-bis-(thiocarbamyl)-hydrazine which separates as a precipitate is removed by filtration; the product is washed with water and dried at 90° C. A yield of 80.2% of product analyzing by ultra-violet 99.4% pure is obtained. The product weighs 121 grams.

*Example 2*

The procedure of Example 1 is followed using an equivalent quantity of potassium thiocyanate instead of ammonium thiocyanate. A comparable quantity of product of comparable quality is obtained.

I claim:

A process for the preparation of N,N'-bis-(thiocarbamyl)-hydrazine which comprises; mixing about 54 parts of concentrated sulfuric acid, 136 to 205 parts of water and about 91 parts of thiosemicarbazide, heating to about 92° C., adding about 85.5 parts of ammonium thiocyanate, refluxing until the reaction is substantially complete, cooling to room temperature, and separating out the thus formed N,N'-bis-(thiocarbamyl)-hydrazine, in a yield of at least 80%, and a purity of at least 99%.

References Cited in the file of this patent

Freund et al.: Ber., vol. 26 (1893), pp. 2877–78.
Freund et al.: Ber., vol. 29 (1896), p. 2501.
Wieland: Die Hydrazine, 5th vol. (1913), p. 221.
Beilstein: vol. 3, System No. 217–218, pp. 196–7 (1918).
Richter: "Org. Chem.," vol. 1, 3rd ed., p. 511 (1944).
Audrieth et al.: J. Org. Chem., vol. 19 (1954), pp. 733–34, 745.